United States Patent
He et al.

(10) Patent No.: US 10,728,033 B2
(45) Date of Patent: Jul. 28, 2020

(54) IDENTITY AUTHENTICATION METHOD, APPARATUS, AND STORAGE MEDIUM

(71) Applicant: TENCENT TECHNOLOGY (SHENZHEN) COMPANY LIMITED, Shenzhen (CN)

(72) Inventors: Rui He, Shenzhen (CN); Liang Dong, Shenzhen (CN); Longhui Chen, Shenzhen (CN); Xuan Zong, Shenzhen (CN); Xueliang Zhan, Shenzhen (CN); Yanrong Chen, Shenzhen (CN); Yanling Zhang, Shenzhen (CN); Chenming Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 113 days.

(21) Appl. No.: 15/711,015

(22) Filed: Sep. 21, 2017

(65) Prior Publication Data

US 2018/0013560 A1    Jan. 11, 2018

Related U.S. Application Data

(63) Continuation of application No. PCT/CN2016/085085, filed on Jun. 7, 2016.

(30) Foreign Application Priority Data

Sep. 28, 2015 (CN) .......................... 2015 1 0627178

(51) Int. Cl.
*H04L 9/32* (2006.01)
*H04W 12/06* (2009.01)
(Continued)

(52) U.S. Cl.
CPC ............... *H04L 9/32* (2013.01); *G06Q 50/01* (2013.01); *H04L 63/08* (2013.01); *H04L 67/10* (2013.01); *H04W 4/21* (2018.02); *H04W 12/06* (2013.01)

(58) Field of Classification Search
CPC ........... H04L 9/32; H04L 63/08; H04L 67/10; H04W 4/21; H04W 12/06; G06Q 50/01
See application file for complete search history.

(56) References Cited

U.S. PATENT DOCUMENTS

2007/0168298 A1 * 7/2007 George ................ G06Q 20/401
                                                                705/75
2011/0126003 A1 * 5/2011 Engert ................ H04L 63/0823
                                                                713/156
(Continued)

FOREIGN PATENT DOCUMENTS

CN          101047503 A        10/2007
CN          103179098 A  *      6/2013
(Continued)

OTHER PUBLICATIONS

The World Intellectual Property Organization (WIPO) International Search Report for PCT/CN2016/085085 dated Aug. 31, 2016 5 Pages (including translation).
(Continued)

*Primary Examiner* — Yonas A Bayou
(74) *Attorney, Agent, or Firm* — Anova Law Group, PLLC

(57) ABSTRACT

Embodiments of the present invention disclose an identity authentication method. The method includes: receiving a request for identity authentication on a target user; sending identity-authentication information on the target user to one or more users in social-network-association with the target user; receiving feedback information from the users in social-network-association with the target user based on the
(Continued)

identity-authentication information; and obtaining a result of identity authentication on the target user according to the feedback information from the users in social-network-association with the target user.

20 Claims, 4 Drawing Sheets

(51) Int. Cl.
*G06Q 50/00* (2012.01)
*H04L 29/06* (2006.01)
*H04L 29/08* (2006.01)
*H04W 4/21* (2018.01)

(56) References Cited

U.S. PATENT DOCUMENTS

| | | | | |
|---|---|---|---|---|
| 2012/0131642 A1* | 5/2012 | Zheng | ................. | H04L 63/0884 726/3 |
| 2012/0317631 A1* | 12/2012 | Assam | .................... | H04L 63/08 726/7 |
| 2013/0031173 A1* | 1/2013 | Deng | ..................... | G06Q 30/02 709/204 |
| 2013/0080538 A1* | 3/2013 | McEachern | ............. | H04L 51/32 709/206 |
| 2013/0144786 A1* | 6/2013 | Tong | ................. | G06Q 20/4014 705/44 |
| 2013/0286161 A1* | 10/2013 | Lv | ...................... | G06K 9/00281 348/46 |
| 2014/0181535 A1* | 6/2014 | Smith | .................. | H04B 5/0056 713/300 |
| 2014/0341446 A1* | 11/2014 | Hare | ..................... | G06F 3/0416 382/124 |
| 2015/0358295 A1* | 12/2015 | Assam | .................... | H04L 63/08 726/7 |
| 2016/0261593 A1* | 9/2016 | Bradley | .............. | H04L 63/0853 |
| 2016/0342781 A1* | 11/2016 | Jeon | ........................ | G06F 21/32 |

FOREIGN PATENT DOCUMENTS

| | | | | |
|---|---|---|---|---|
| CN | 103179098 A | 6/2013 | | |
| CN | 104158728 A | 11/2014 | | |
| CN | 104348822 A | 2/2015 | | |
| CN | 104883367 A | 9/2015 | | |
| CN | 105323219 A | 2/2016 | | |
| CN | 105516133 A | 4/2016 | | |
| CN | 103179098 B | * 3/2017 | | |
| EP | 2560340 A1 | * 2/2013 | ......... | H04L 63/1483 |
| EP | 2560340 A1 | 2/2013 | | |
| WO | WO-2008064467 A1 | * 6/2008 | ......... | G06F 21/6245 |
| WO | WO-2013078268 A1 | * 5/2013 | ......... | G06Q 20/4014 |
| WO | WO-2017054504 A1 | * 4/2017 | ............ | H04W 12/06 |
| WO | WO-2017190670 A1 | * 11/2017 | .............. | G06N 7/005 |

OTHER PUBLICATIONS

The State Intellectual Property Office of the People's Republic of China (SIPO) Office Action 1 for 201510627178.3 dated May 22, 2019 9 Pages (including translation).

* cited by examiner

IDENTITY AUTHENTICATION METHOD, APPARATUS, AND STORAGE MEDIUM

RELATED APPLICATIONS

This application is a continuation application of PCT Patent Application No. PCT/CN2016/085085, filed on Jun. 7, 2016, which claims priority to Chinese Patent Application No. 201510627178.3, entitled "IDENTITY AUTHENTICATION METHOD AND APPARATUS" filed on Sep. 28, 2015, the entire content of both of which is incorporated herein by reference.

FIELD OF THE TECHNOLOGY

The present disclosure relates to the field of Internet technologies, and in particular, to an identity authentication method and apparatus.

BACKGROUND OF THE DISCLOSURE

As Internet applications are being more widely used in various application scenarios and having broader functions, the Internet applications gradually are starting to get into more private personal information of users. For example, in social network software such as QQ or Weibo, there may be personal photos uploaded by a user, a chat history with a friend, a gift money account balance, personal information of the user's friend, and the like. For another example, in an Internet financial product such as Alipay or WeChat Pay, there may be information of a bank card bound by a user or information of a wealth management product, and the like. Therefore, user identity authentication for the Internet applications is quite important.

Currently, a general solution of user identity authentication is to have a user upload a photo of the user's identification card (ID card) and a photo of the user, and to check the consistency between the uploaded photo of the user and the photo of the identification card so as to authenticate the user's identity. However, a photo may be modified by using image processing software, for example, a personal photo, identity information, and the like in a photo of an identification card may be modified, causing high probability of mistaken authentication during an identity authentication process. Consequently, an unauthorized user may use a corresponding Internet application, further resulting in user privacy leakage, and even pecuniary loss.

SUMMARY

Embodiments of the present invention are intended to resolve at least the above technical problems by providing an identity authentication method and apparatus, so as to authenticate a user identity more accurately, thereby further effectively avoiding security problems caused by mistaken authentication.

An aspect of the present invention provides an identity authentication method. The method includes: receiving a request for identity authentication on a target user; sending identity-authentication information on the target user to one or more users in social-network-association with the target user; receiving feedback information from the users in social-network-association with the target user based on the identity-authentication information; and obtaining a result of identity authentication on the target user according to the feedback information from the users in social-network-association with the target user.

Another aspect of the present invention further provides an identity authentication system. The system includes a memory and a processor coupled to the memory. The processor is configured for receiving a request for identity authentication on a target user; sending identity-authentication information on the target user to one or more users in social-network-association with the target user; receiving feedback information from the users in social-network-association with the target user based on the identity-authentication information; and obtaining a result of identity authentication on the target user according to the feedback information from the users in social-network-association with the target user.

Another aspect of the present invention further provides a non-transitory computer-readable storage medium containing computer-executable program instructions. The computer-executable program instructions can be executed by a processor to perform an identity authentication method. The method includes: receiving a request for identity authentication on a target user; sending identity-authentication information on the target user to one or more users in social-network-association with the target user; receiving feedback information from the users in social-network-association with the target user based on the identity-authentication information; and obtaining a result of identity authentication on the target user according to the feedback information from the users in social-network-association with the target user.

BRIEF DESCRIPTION OF THE DRAWINGS

To describe the technical solutions of the embodiments of the present invention more clearly, the following briefly introduces the accompanying drawings. Apparently, the accompanying drawings in the following description show only some embodiments of the present invention, and a person of ordinary skill in the art may derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are only some of the embodiments of the present invention rather than all of the embodiments. Other embodiments obtained by a person of ordinary skill in the art based on the embodiments of the present invention without creative efforts shall fall within the protection scope of the present disclosure.

Figure 1:
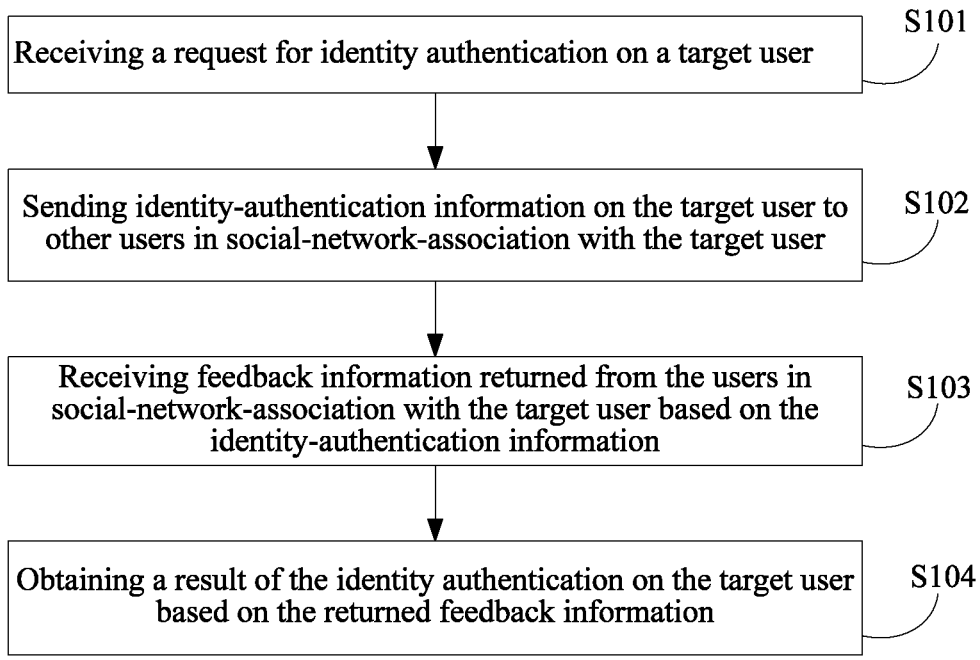
FIG. 1 is a schematic flowchart of an identity authentication method according to embodiments of the present invention.

FIG. 1 is a schematic flowchart of an identity authentication method according to embodiments of the present invention. The identity authentication method may be performed by an identity authentication apparatus. The identity authentication apparatus may be a computing device such as a server and/or a software program run on the server. As shown in FIG. 1, the method includes at least the activities described in S101-S014.

S101: Receiving a request for identity authentication on a target user.

Specifically, a server may receive the request for identity authentication on a target user. The request may be sent to the server after the target user actively starts an identity authentication function of a target application program, or may be sent to the server when the target application program detects that a function used by the target user needs identity authentication or detects that the operation by the target user does not meet a security standard. It should be noted that, the server may be a backend server corresponding to the application program sending the identity authentication request, or may be a separate authentication server that processes the identity authentication request, without any specific limitation.

Using WeChat as an example, in WeChat, a control button may be set for requesting identity authentication. If the target user forgets a password, or if other types of authentication fails, the target user may send a request for identity authentication on the target user itself to the server by clicking on the control button. For another example, when a WeChat server detects that the target user fails several times to log in WeChat or often logs in WeChat outside its home region, the WeChat server may send an identity authentication request to an identity authentication server to verify whether the user logged in is the real user.

In specific implementation, the identity authentication request may include a user identifier of the target user, such as a Weibo account of the target user, a QQ number, and the like. Using the user identifier, the server may find user information corresponding to the user identifier, and information of other users in social-network-association with the user identifier. The information of other users in social-network-association with the user identifier may include user identifiers of the other users, social network attributes, and social network groups, etc.

S102: Sending identity-authentication information on the target user to other users in social-network-association with the target user.

Specifically, after receiving the request for identity authentication on the target user, the server searches for other users in social-network-association with the target user, and sends identity-authentication information on the target user to the users in social-network-association with the target user. A user in social-network-association with the target user is a user that has a pre-established social-network association relationship with the target user, such as a friend, a contact, a fan, and the like, and may also be referred as a social-network-associated user. It should be noted that the identity-authentication information may be sent to one or more users in social-network-association with the target user, or may be sent to all users in social-network-association with the target user.

In specific implementation, the server may use the user identifier of the target user included in the identity authentication request to find user information of the target user and user identifiers of the corresponding social-network-associated users of the target user. The server may then send the identity-authentication information of the target user to the user identifiers of the corresponding social-network-associated users. It should be noted that the identity-authentication information on the target user that is sent to the social-network-associated users may be sent by the server using the user identifier of the target user, or may be sent by the server using other identifiers, or may be sent by the server in a form of a system message, or the like.

For example, a WeChat server may send the identity-authentication information on target user A to A's friends using the WeChat ID of the target user A, or may notify A's friends of the identity-authentication information on A by using a system message of "Authentication notice from a WeChat friend", or may send the identity-authentication information on A to A's friends by using a WeChat public account, such as "Mphelper".

In certain embodiments, the identity-authentication information on a target user may include authentication questions about personal information of the target user, or may only include query information about whether a social-network-associated user is willing to guarantee that the target user is the real user. No specific limitation is intended herein.

For example, a target user A may be asked to fill out a personal information form when the target user A applies for identity authentication, and the identity-authentication information is sent to A's friends according to the information in the personal information form. The identity-authentication information is: "Your friend A applies for identity authentication in the system, please help to verify whether the following information is accurate: A attended school at XX school, and knows XX . . . , if the information is accurate, please click 'Yes', otherwise, please click 'No'". Or the identity-authentication information may be sent to A's friends as follows: "Your friend A applies for identity authentication in the system, are you willing to guarantee for her? If you are willing to guarantee, please click 'Yes', otherwise, please click 'No'".

S103: Receiving feedback information returned from the users in social-network-association with the target user based on the identity-authentication information.

Specifically, after receiving the identity-authentication information on the target user that is sent by the server, a user in social-network-association with the target user may provide a feedback about the identity-authentication information, and the feedback information is generated and returned to the server. It should be noted that, the feedback information is information that is returned according to the content of the identity-authentication information, may be a confirmative feedback or a negative feedback that is returned after the user in social-network-association with the target user clicks a feedback button in the identity-authentication information, or may be an informational text or a piece of digital code that answers authentication questions in the identity-authentication information, or the like, without any specific limitation.

For example, a target user A may be asked to fill out a personal information form, and the identity-authentication information may be sent to A's friend according to information in the personal information form. The identity-authentication information is: "Your friend A applies for identity authentication in the system, please select and answer three questions: 1. Did A attend school at XX school? 2. Does A know XX? . . . ". After receiving the identity-authentication information, A's friend may reply: "1. Yes; 2. No . . . ".

S104: Obtaining a result of the identity authentication on the target user based on the returned feedback information.

Specifically, the result of the identity authentication on the target user may be obtained by analyzing the received feedback information from the users in social-network-association with the target user in S103.

In certain embodiments, for different types of feedback information, the result of the identity authentication on the target user may be analyzed in different formats. If the feedback information is a confirmative or negative feedback replying to the query of the target user identity, the server may determine whether the identity authentication on the target user is successful by calculating a ratio of the number of confirmative replies to the total number replies and determining whether the ratio exceeds a preset threshold.

For example, after 100 friends of the target user A receive identity-authentication information of "Your friend A applies for identity authentication in the system, are you willing to guarantee for her? If you are willing to guarantee, please click 'Yes', otherwise, please click 'No'", 63 friends return "Yes" to the server, 30 friends return "No" to the server, and remaining friends do not reply. In this case, the ratio of the number of confirmative replies to the total number replies is 63/93 (68%). If it is predetermined that the identity authentication on A is successful if the ratio of the number of confirmative replies to the total number replies is over 50%, the result of the identity authentication on A is successful in such a case.

In some embodiments, the feedback information includes answers to the authentication questions about personal information of the target user, and the server may determine a matching degree between the information in the personal information and corresponding feedback information according to the personal information form that is filled out by the target user when applying for identity authentication. Based on the matching degree, the server can determine whether the identity authentication on the target user is successful.

For example, after 100 friends of a user B receive identity-authentication information of "Did B attend school at XX school?", 72 friends return "No" to the server. However, when applying for identity authentication, the user B fills out the personal information form to indicate that she attended school at XX school. Thus, the information in the personal information form does not match with the corresponding feedback information from a majority of friends. Therefore, the result of the identity authentication on B is determined as failure. Further, feedback information of multiple authentication questions may be jointly analyzed, so as to determine a result of the identity authentication on the target user.

According to the embodiments of the present invention, by receiving feedback information returned by users in social-network-association with a target user according to identity-authentication information on the target user, a result of identity authentication on the target user can be determined. Compared with the currently-used solution of performing identity authentication on a user according to an identification card and a photo of the user uploaded by the user, the disclosed method avoids the risk of image modification existing in such solution, and improves accuracy and reliability of identity authentication, thereby effectively avoiding security problems caused by mistaken authentication.

Figure 2:
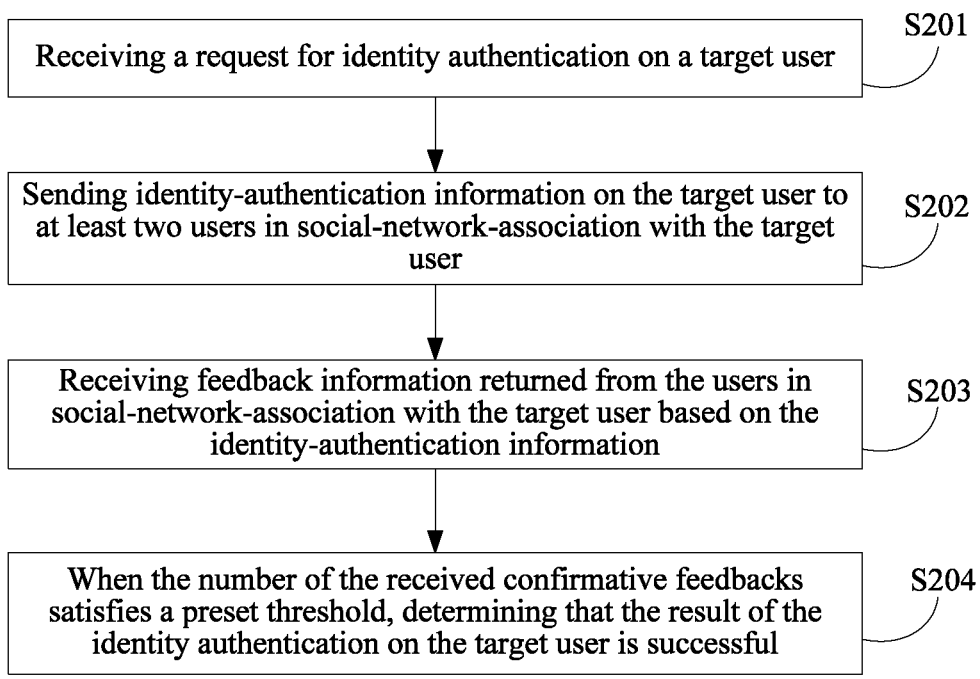
FIG. 2 is a schematic flowchart of another identity authentication method according to embodiments of the present invention.

FIG. 2 is a schematic flowchart of an identity authentication method according to embodiments of the present invention. As shown in FIG. 2, the method includes followings activities in S201-S204.

S201: Receiving a request for identity authentication on a target user. This may be similar to S101 in FIG. 1, description of which is omitted here.

S202: Sending identity-authentication information on the target user to at least two users in social-network-association with the target user.

Specifically, after receiving the request for identity authentication on the target user, the server searches for other users in social-network-association with the target user in the server, selects at least two users in social-network-association with the target user, and sends identity-authentication information on the target user to the at least two selected users in social-network-association with the target user. It should be noted that the users in social-network-association with the target user may be selected with different criteria. For example, all users in social-network-association with the target user may be ranked based on user level, and only the users ranked within certain number of positions from the top may be selected; or all the users in social-network-association with the target user may be ranked based on the length of time in social-network-association with the target user, and only the users ranked within certain number of positions from the top may be selected; or the users may be randomly selected from all users in social-network-association with the target user. No specific limitation is intended herein. Also, the number of the social-network-associated users to be selected may be predetermined. For example, the identity-authentication information may be selectively sent to the users ranked top 30 among all users in social-network-association with the target user.

In specific implementation, the server may use the user identifier of the target user included in the identity authentication request to find user information of the target user and user identifiers of the corresponding social-network-associated users of the target user. The server may then send the identity-authentication information of the target user to the user identifiers of the corresponding social-network-associated users. It should be noted that the identity-authentication information on the target user that is sent to the social-network-associated users may be sent by the server using the user identifier of the target user, or may be sent by the server using other identifiers, or may be sent by the server in a form of a system message, or the like.

For example, a WeChat server may send the identity-authentication information on target user A to A's friends using the WeChat ID of the target user A, or may notify A's friends of the identity-authentication information on A by using a system message of "Authentication notice from a WeChat friend", or may send the identity-authentication information on A to A's friends by using a WeChat public account, such as "Mphelper".

In certain embodiments, the identity-authentication information on the target user may be query information querying whether a user in social-network-association can prove that the target user is the real user. For example, user A applies for identity authentication. Identity-authentication information may be sent to A's friends including "Your friend A applies for identity authentication in the system, can you prove that A is the real user? If you can prove that A is the real user, please click 'Yes', otherwise please click 'No'".

S203: Receiving feedback information returned from the users in social-network-association with the target user based on the identity-authentication information.

Specifically, after receiving the identity-authentication information on the target user that is sent by the server, a user in social-network-association with the target user may provide a feedback about the identity-authentication information, and the feedback information is generated and returned to the server. It should be noted that, the feedback information is information that is returned according to the content of the identity-authentication information, and may be a confirmative feedback or a negative feedback on the identity-authentication information.

For example, user A applies for identity authentication. Identity-authentication information may be sent to A's friend including: "Your friend A applies for identity authentication in the system, please help to check whether the following information is accurate: A attended school at XX school and knows XX . . . , if the information is accurate, please click 'Yes', otherwise please click 'No'". After receiving the identity-authentication information, A's friend may return "Yes" or "No" as feedback information according to what he or she knows about A. "Yes" is a confirmative feedback.

S204: When the number of the received confirmative feedbacks satisfies a preset threshold, determining that the result of the identity authentication on the target user is successful.

Specifically, based on the number of selected social-network-associated users in S202, the server may correspondingly set the threshold, and the server may determine whether the identity authentication on the target user is successful according to whether the number of the received confirmative feedbacks is greater than or equal to the preset threshold. For example, the server selects 100 friends of user A and sends identity-authentication information to the 100 friends as follows: "Your friend A applies for identity authentication in the system, please help to check whether the following information is accurate: A attended school at XX school and knows XX . . . , if the information is accurate, please click 'Yes', otherwise please click 'No'". The server receives confirmative feedbacks of "Yes" returned by 67 friends, and negative feedbacks of "No" returned by 12 friends, and 21 friends do not return any feedback information. If the preset threshold is 55, it is determined that the number of the confirmative feedbacks received by the server satisfies the preset threshold. Therefore, the server determines that the result of the identity authentication on the target user is successful.

According to the embodiments of the present invention, by sending identity-authentication information on the target user to at least two users in social-network-association with the target user, and based on a preset threshold and returned feedback information of the identity-authentication information on the target user, a result of identity authentication on the target user can be determined. Compared with the currently-used solution of performing identity authentication on a user according to an identification card and a photo of the user uploaded by the user, the disclosed method avoids the risk of image modification existing in such solution, and improves accuracy and reliability of identity authentication.

Figure 3:
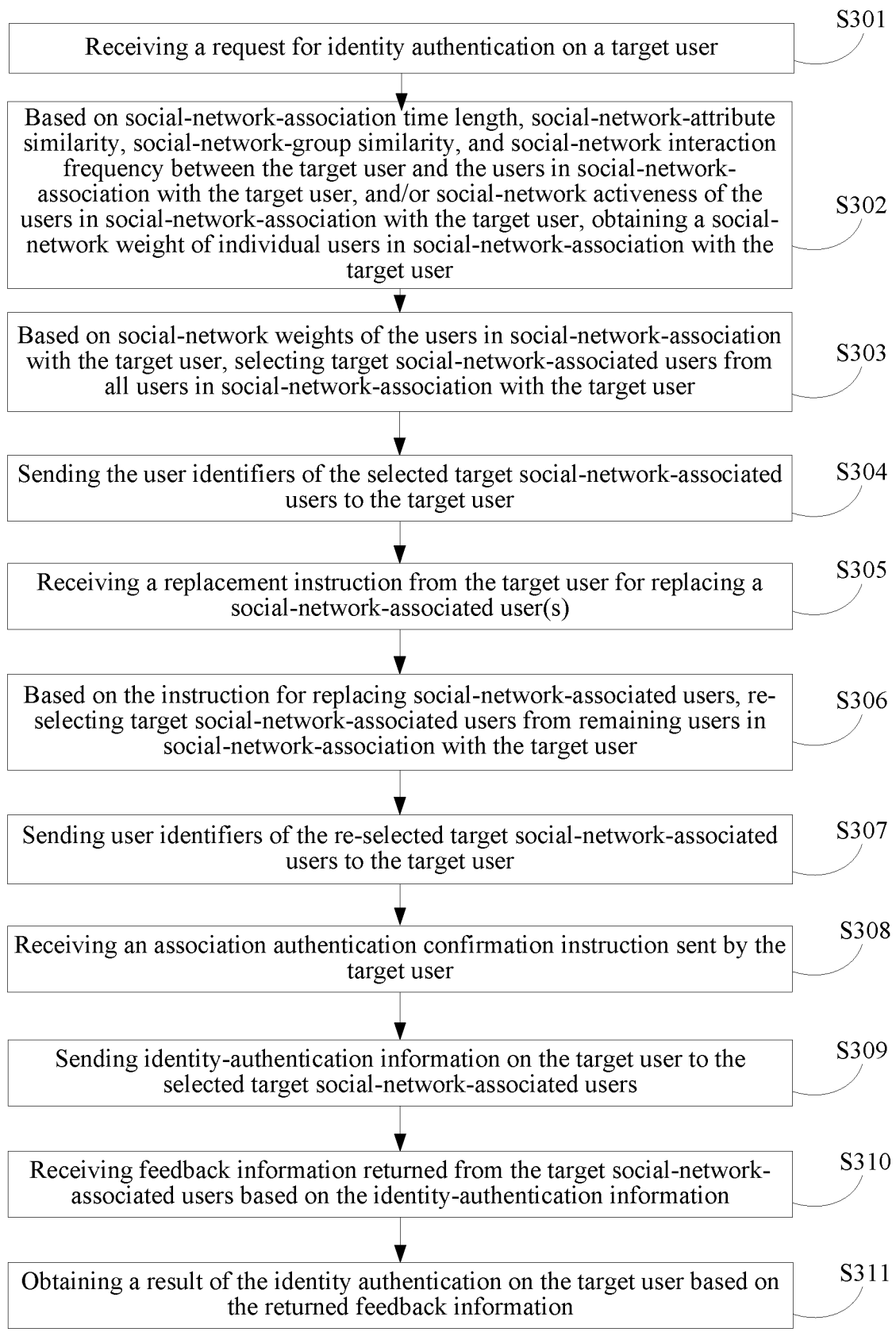
FIG. 3 is a schematic flowchart of another identity authentication method according to embodiments of the present invention.

FIG. 3 is a schematic flowchart of an identity authentication method according to embodiments of the present invention. As shown FIG. 3, the method specifically includes activities in S301 to S311.

S301: Receiving a request for identity authentication on a target user. This may be similar to S101 in FIG. 1, description of which is omitted here.

S302: Based on social-network-association time length, social-network-attribute similarity, social-network-group similarity, and social-network interaction frequency between the target user and the users in social-network-association with the target user, and/or social-network activeness of the users in social-network-association with the target user, obtaining a social-network weight of individual users in social-network-association with the target user.

Specifically, the server may use the user identifier of the target user included in the identity authentication request to find social-network parameter information of the target user and social-network parameter information of the corresponding social-network-associated users of the target user. The social-network parameter information may include a social-network attribute (for example, a native place, a nickname, a current location, a school graduated from, or a company where the user works), a social-network group (for example, a friend, a group, or a temporary group), and a social-network activeness parameter (for example, online time length, number of times of message update, or number of browsed messages) of a corresponding user, and a time length of the social-network-association with the target user (for example, association of 2 years, or association since 1998), and a social-network interaction frequency (a frequency of receiving and sending messages, or a frequency of mutually browsing or commenting on social-network spaces). By obtaining such social-network parameter information, the server may numerically quantize the social-network weight of the user in social-network-association with the target user.

In certain embodiments, the server may determine the social-network weight according to the social-network-association time, social-network attribute similarity, social-network group similarity, or social-network interaction frequency between the target user and the user in social-network-association with the target user, or social-network activeness of the user in social-network-association with the target user. Specifically, the social-network-association time may be a time length for which the target user and the user in social-network-association with the target user has been friends, and a longer time length corresponds to a larger social-network weight. The social-network attribute similarity may be a percentage of same or consistent social-network attributes of both the target user and the user in social-network-association with the target user, and higher social-network attribute similarity corresponds to larger social-network weight. The social-network group similarity may be a percentage of same or consistent social-network groups of both the target user and the user in social-network-association with the target user, and higher social-network group similarity corresponds to larger social-network weight. The social-network interaction frequency may be the number of times of social-network interaction between the target user and the user in social-network-association with the target user over a preset time period, and a larger number of social interactions over the preset time length corresponds to a higher social-network interaction frequency and a larger social-network weight. The social-network activeness of the user in social-network-association with the target user may be an activeness value calculated according to a social-network parameter information of the user in social-network-association with the target user, and a larger activeness value corresponds to a larger social-network weight.

In specific implementation, based on the social-network parameter information of the target user and the user in social-network-association with the target user, the server may separately quantize the social-network-association time, the social-network attribute similarity, social-network group similarity, and a social-network interaction frequency between the target user and the user in social-network-association with the target user, and/or social-network activeness of the user in social-network-association with the target user.

For example, the social-network attribute similarity may be quantized according to a user location, a school graduated from, and a company where the user works. When a target user A and A's friend B are in a same location and work in a same company, the social-network attribute similarity may be 67% (i.e., ⅔). Here, it is assumed that a user location, a school graduated from, and a company where the user works have a same effect on the social-network attribute similarity. In specific implementation, the three elements may have different effects on the social-network attribute similarity. The server may adjust weight values according to importance and impact of each social-network parameter. Similarly, the social-network group similarity may be quantized according to the ratio of mutual friends or mutual groups of the target user and the user in social-network-association with the target user.

For another example, the server may set the threshold of the number of social-network interactions over a preset time length to 20. If the number of times of social-network interactions between the target user A and A's friend B over a preset time length is 16, the social-network interaction frequency is quantized as 80% in percentage.

For another example, the social-network activeness may be quantized using an average online time per day, the number of average message update times per day, and an average number of browsed messages per day. It is assumed that the average online time per day is 8 hours, the number of average message update times per day is 2, and the average number of browsed messages per day is 20. The server may set a formula for social-network activeness calculation as: the average online time per day (hour)*20%+ the number of average message update times per day*40%+ the average number of browsed messages per day*40%. Therefore, the social-network activeness may be calculated as 10.4. Further, if a social-network activeness threshold is set to 50, the social-network activeness is quantized as 20% in percentage.

Further, based on the impact on the social-network weight, the server may separately set a ratio in a quantized social-network weight for the social-network-association time, the social-network attribute similarity, the social-network group similarity, and the social-network interaction frequency between the target user and the user in social-network-association with the target user, and/or the social-network activeness of the user in social-network-association with the target user. For example, the server may set the ratio of the social-network-association time to 10%, the ratio of the social-network attribute similarity to 10%, the ratio of the social-network group similarity to 25%, the ratio of the social-network interaction frequency to 35%, and the ratio of the social-network activeness to 20%. In this case, the server may calculate the social-network weight according to these ratios, in the quantized social-network weight, of the social-network-association time, the social-network attribute similarity, the social-network group similarity, and the social-network interaction frequency between the target user and the user in social-network-association with the target user, or social-network activeness of the user in social-network-association with the target user. For example, a user A and A's friend D have been in social-network-association for 2 years (if an association time threshold is 20, a social-network-association time is quantized as 10% in percentage), social-network attribute similarity is 72%, social-network group similarity is 60%, a social-network interaction frequency is 85%, and social-network activeness is 20%. A social-network weight of the target user A and A's friend D is obtained by calculating according to the formula 10%*10%+72%*10%+60%*25%+85%*35%+20%*20%=0.57, that is, the social-network weight is 0.57.

It should be noted that, the social-network weight is expressed in a normalized expression herein, and the server may set other types of expression to implement quantization, without any specific limitation. For example, if the highest quantized value of the social-network weight is set to 10, the highest quantized values of the social-network-association time, social-network attribute similarity, social-network group similarity, and the social-network interaction frequency between a target user and a user in social-network-association with the target user, and social-network activeness of the user in social-network-association with the target user may respectively be 1, 1, 2.5, 3.5, 2.

S303: Based on social-network weights of the users in social-network-association with the target user, selecting target social-network-associated users from all users in social-network-association with the target user.

Specifically, according to the social-network weights of the users in social-network-association with the target user that are obtained in S302, the server may select a certain number of target users in social-network-association with the target user according to the social-network weights ranked in descending order, from the highest to the lowest. In specific implementation, the server may set the number of target social-network-associated users and, for example, select the first ten social-network-associated users as the target social-network-associated users based on their respective social-network weights in descending order. Alternatively, the server may set a social-network weight threshold and, for example, select social-network-associated users having a social-network weight of over the social-network weight threshold (e.g., 0.6) as the target social-network-associated users.

S304: Sending the user identifiers of the selected target social-network-associated users to the target user.

Specifically, after selecting the number of target social-network-associated users, the server may first send the user identifiers of the target social-network-associated users to the target user. After receiving the user identifiers of the target social-network-associated users, the target user may learn the target social-network-associated users selected by the server. For example, after a target user A applies for identity authentication, the server selectively sends identity-authentication information to A's friends B, C, and D. Before the identity-authentication information is sent, user A may receive the user identifiers (e.g., nicknames or accounts) of B, C, and D that are sent by the server.

S305: Receiving a replacement instruction from the target user for replacing a social-network-associated user(s).

Specifically, after the target user receives the user identifiers of the target social-network-associated users selected by the server in S304, because a social-network-associated user selected by the server may be a user whom the target user has not contacted with for a long time or whose social-network activeness is not high, the target user may need to replace some or all of the selected target socialnetwork-associated users. The target user may send a replacement instruction to the server for replacing the social-network-associated users. The instruction for replacing an associated user may be an instruction that is triggered after the target user clicks a virtual button such as "replace a social-network-associated user", or that is triggered when the target user presses a physical button or a keyboard on the terminal running the corresponding Internet application; or that is triggered by a text or a character directly inputted by the target user, for example, "replace".

For example, after a Weibo user A receives a message sent by the server, user A knows that A's friend B, C, and D are selected to send the identity-authentication information to, but finds out that both B and C do not often use Weibo, or rarely log in Weibo, and user D is a friend known by Weibo interaction, who does not know A's real information. In such case, user A may click the button of "replace a friend", and send the instruction for replacing the social-network-associated users to the server.

S306: based on the instruction for replacing social-network-associated users, reselecting target social-network-associated users from remaining users in social-network-association with the target user.

Specifically, after the instruction for replacing a social-network-associated user(s) returned by the target user is received, the previously-selected target social-network-associated user(s) is removed from the social-network-associated users, and a certain number of social-network-associated users are again selected from the remaining social-network-associated users according to S302 and S303.

S307: Sending user identifiers of the re-selected target social-network-associated users to the target user.

Specifically, the user identifiers of the target social-network-associated users reselected in S306 is sent to the target user.

S308: Receiving an association authentication confirmation instruction sent by the target user.

Specifically, when most of received user identifiers of target social-network-associated users re-selected by the server correspond to users who know well about the real identity of the target user, the target user may send an association authentication confirmation instruction to the server, so as to trigger the server to send identity-authentication information on the target user to the re-selected target social-network-associated users. The association authentication confirmation instruction may be an instruction that is triggered after the target user clicks a virtual button such as "confirm social-network-associated users", or that is triggered when the target user presses a physical button or a keyboard on the terminal running the corresponding Internet application; or that is triggered by a text or a character directly inputted by the target user, for example, "confirm".

S309: Sending identity-authentication information on the target user to the selected target social-network-associated users.

Specifically, after receiving the association authentication confirmation instruction sent by the target user, the server may send the identity-authentication information on the target user to the selected target social-network-associated users. In specific implementation, the identity-authentication information on the target user that is sent to the social-network-associated users may be sent by the server using the user identifier of the target user, or may be sent by the server using other identifiers, or may be sent by the server in a form of a system message, or the like.

For example, a WeChat server may send the identity-authentication information on target user A to A's friends using the WeChat ID of the target user A, or may notify A's friends of the identity-authentication information on A by using a system message of "Authentication notice from a WeChat friend", or may send the identity-authentication information on A to A's friends by using a WeChat public account, such as "Mphelper".

In certain embodiments, the identity-authentication information on a target user may include authentication questions about personal information of the target user, or may only include query information about whether a social-network-associated user is willing to guarantee that the target user is the real user. No specific limitation is intended herein.

For example, a target user A may be asked to fill out a personal information form when the target user A applies for identity authentication, and the identity-authentication information is sent to A's friends according to the information in the personal information form. The identity-authentication information is: "Your friend A applies for identity authentication in the system, please help to verify whether the following information is accurate: A attended school at XX school, and knows XX . . . , if the information is accurate, please click 'Yes', otherwise, please click 'No'". Or the identity-authentication information may be sent to A's friends as follows: "Your friend A applies for identity authentication in the system, are you willing to guarantee for her? If you are willing to guarantee, please click 'Yes', otherwise, please click 'No'".

S310: Receiving feedback information returned from the target social-network-associated users based on the identity-authentication information.

Specifically, after receiving the identity-authentication information on the target user that is sent by the server, a target social-network-associated user may provide a feedback about the identity-authentication information, and the feedback information is generated and returned to the server. It should be noted that, the feedback information is information that is returned according to the content of the identity-authentication information, may be a confirmative feedback or a negative feedback that is returned after the target social-network-associated user clicks a feedback button in the identity-authentication information, or may be an informational text or a piece of digital code that answers authentication questions in the identity-authentication information, or the like, without any specific limitation.

For example, a target user A may be asked to fill out a personal information form, and the identity-authentication information may be sent to A's friend according to information in the personal information form. The identity-authentication information is: "Your friend A applies for identity authentication in the system, please select and answer three questions: 1. Did A attend school at XX school? 2. Does A know XX? . . . ". After receiving the identity-authentication information, A's friend may reply: "1. Yes; 2. No . . . ".

S311: Obtaining a result of the identity authentication on the target user based on the returned feedback information.

Specifically, the result of the identity authentication on the target user may be obtained by analyzing the received feedback information from the social-network-associated users in S310.

In certain embodiments, for different types of feedback information, the result of the identity authentication on the target user may be analyzed in different formats. If the feedback information is a confirmative or negative feedback replying to the query of the target user identity, the server may determine whether the identity authentication on the target user is successful by calculating a ratio of the number of confirmative replies to the total number replies and determining whether the ratio exceeds a preset threshold.

For example, after 100 friends of the target user A receive identity-authentication information of "Your friend A applies for identity authentication in the system, are you willing to guarantee for her? If you are willing to guarantee, please click 'Yes', otherwise, please click 'No'", 63 friends return "Yes" to the server, 30 friends return "No" to the server, and remaining friends do not reply. In this case, the ratio of the number of confirmative replies to the total number replies is 63/93 (68%). If it is predetermined that the identity authentication on A is successful if the ratio of the number of confirmative replies to the total number replies is over 50%, the result of the identity authentication on A is successful in such a case.

In some embodiments, the feedback information includes answers to the authentication questions about personal information of the target user, and the server may determine a matching degree between the information in the personal information and corresponding feedback information according to the personal information form that is filled out by the target user when applying for identity authentication. Based on the matching degree, the server can determine whether the identity authentication on the target user is successful.

Using authentication based on personal information as an example, after 100 friends of a user B receive identity-authentication information of "Your friend A applies for identity authentication in the system, please help answering the authentication question: Did B attend school at XX school?", 72 friends return "No" to the server. However, when applying for identity authentication, the user B fills out the personal information form to indicate that she attended school at XX school. Thus, the information in the personal information form does not match with the corresponding feedback information from a majority of friends. Therefore, the result of the identity authentication on B is determined as failure. Further, feedback information of multiple authentication questions may be jointly analyzed, so as to determine a result of the identity authentication on the target user.

In certain embodiments of the present invention, respective social-network weights are set for users in social-network-association with the target user, and target social-network-associated user are selected according to the social-network weights. In addition, the target user is allowed to replace the social-network-associated users selected by the server, and the feedback information returned from replaced social-network-associated users is received by the server, so as to further determine a result of identity authentication on the target user. Compared with the currently-used solution of performing identity authentication on a user according to an identification card and a photo of the user uploaded by the user, the disclosed method can select social-network-associated users more accurately and can allow the target user to participate in the selection of the social-network-associated users, thereby improving user experience, and significantly improving the identity authentication reliability.

Figure 4:
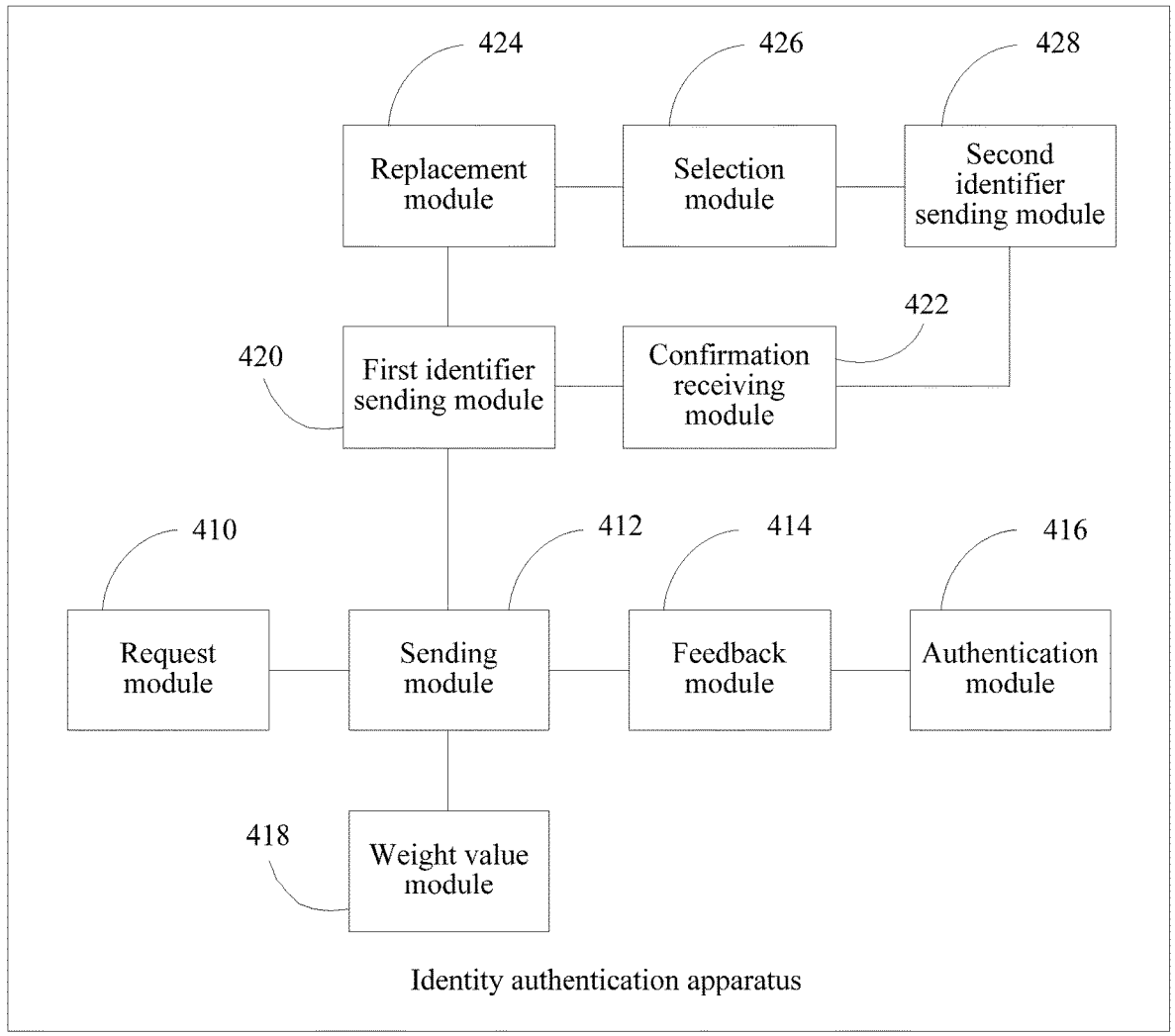
FIG. 4 is a block diagram of an identity authentication apparatus according to embodiments of the present invention.

FIG. 4 is a structural block diagram of an identity authentication apparatus according to embodiments of the present invention. As shown in FIG. 4, the apparatus includes a request module 410, a sending module 412, a feedback module 414, an authentication module 416, a weight value module 418, a first identifier sending module 420, a confirmation receiving module 422, a replacement module 424, a selection module 426, and a second identifier sending module 428. The following makes descriptions separately.

The request module 410 is configured to receive a request for identity authentication on a target user. The sending module 412 is configured to send identity-authentication information on the target user to a user in social-network-association with the target user.

Specifically, the request for identity authentication on a target user that is received by the request module 410 may be sent to the server by the target user after the target user actively starts an identity authentication function of a target application program, or may be sent to the server when the target application program detects that a function used by the target user needs identity authentication or detects that the operation by the target user does not meet a security standard. It should be noted that, the server may be a backend server corresponding to the application program sending the identity authentication request, or may be a separate authentication server that processes the identity authentication request, without any specific limitation.

Figure 5:
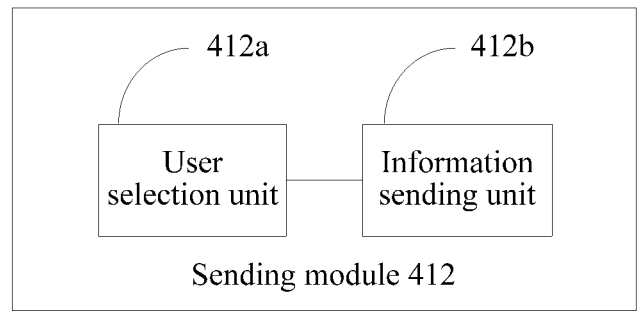
FIG. 5 is a block diagram of a sending module in FIG. 4 according to embodiments of present invention.

Further, as shown in FIG. 5, the sending module 412 may further include: a user selection unit 412a and an information sending unit 412b. The user selection unit 412a is configured to select a certain number of target social-network-associated user from all social-network-associated users according to the social-network weights of the social-network-associated users. The information sending unit 412b is configured to send identity-authentication information on the target user to the target social-network-associated users.

The feedback module 414 is configured to receive feedback information that is returned, according to the identity-authentication information, by the users in social-network-association with the target user. The authentication module 416 is configured to obtain a result of the identity authentication on the target user according to the feedback information. Specifically, the result of the identity authentication on the target user may be obtained by the authentication module 416 by analyzing the received feedback information from the users in social-network-association with the target user that is received by the feedback module 414. Optionally, the authentication module 416 is specifically configured to: if the number of received confirmative feedbacks meets a preset threshold, the result of the identity authentication on the target user is successful.

The weight value module 418 is configured to obtain a social-network weight of the user in social-network-association with the target user according to a social-network-association time, social-network attribute similarity, social-network group similarity, and a social-network interaction frequency between the target user and the user in social-network-association with the target user, and/or social-network activeness of the user in social-network-association with the target user.

The first identifier sending module 420 is configured to send a user identifier of the target social-network-associated user to the target user.

The confirmation receiving module 422 is configured to receive an association authentication confirmation instruction sent by the target user.

The replacement module 424 is configured to receive an instruction for replacing a social-network-associated user that is sent by the target user.

The selection module 426 is configured to re-select, according to the instruction for replacing the social-network-associated user, a target social-network-associated user from remaining users in social-network-association with the target user.

The second identifier sending module 428 is configured to send a user identifier of the reselected target social-network-associated user to the target user. Specifically, the identifier of the target social-network-associated user reselected by the selection module 426 is sent to the target user.

According to the embodiments of the present invention, by receiving feedback information returned by users in social-network-association with a target user according to identity-authentication information on the target user, a result of identity authentication on the target user can be determined. Compared with the currently-used solution of performing identity authentication on a user according to an identification card and a photo of the user uploaded by the user, the disclosed method avoids the risk of image modification existing in such solution, adds a mechanism of selecting a friend according to a social-network weight, and significantly improves reliability of identity authentication, thereby effectively avoiding security problems caused by mistaken authentication.

A person of ordinary skill in the art may understand that all or some of the processes in the foregoing method embodiments may be implemented by scheduling a computer program to instruct relevant hardware. The program may be stored in a computer readable storage medium. When the program is executed by a hardware processor of the identity authentication apparatus, the processes of the foregoing method embodiments are performed. The computer storage medium may include but is not limited to: a magnetic disk, an optical disc, a read-only memory (ROM), or a random access memory (RAM). In addition, the foregoing computer readable storage medium may be various recording media that can be accessed by a computer apparatus by means of a network or a communications link, and for example, a recording medium in which data may be extracted by using a router, the Internet, a local area network, or the like. In addition, the foregoing computer readable storage medium may be multiple computer readable storage media that are located, for example, in a same computer system, or may be a computer readable storage medium that is distributed, for example, in multiple computer systems or computing devices.

Figure 6:
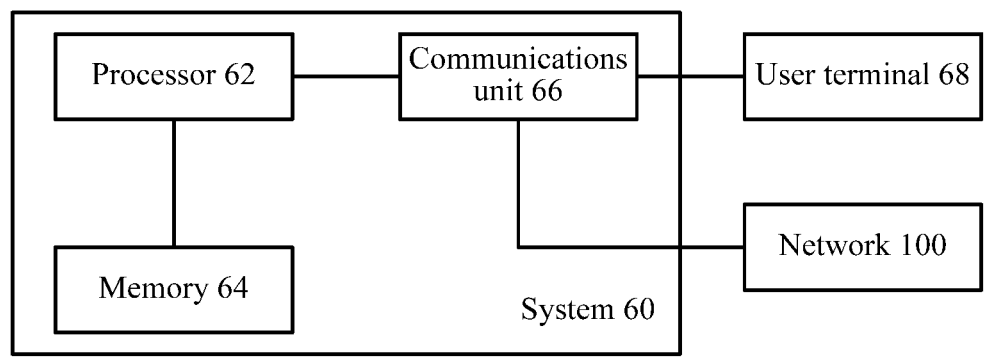
FIG. 6 is a structural block diagram of an identity authentication system according to embodiments of the present invention.

In addition, embodiments of the present invention further provide an identify authentication system. FIG. 6 is a structural block diagram of the system according to the embodiments of present invention. As shown in FIG. 6, the system 60 may include one or more processors 62 (for description convenience, a processor is shown in the figure) and a memory 64. Specifically, the memory 64 stores computer programs or machine code. When the processor 62 calls and performs, by accessing the memory 64, the computer programs or the machine code in the memory 64, operations according to methods or apparatuses of any one of the embodiments of the present invention may be implemented. The system 60 may coincide with, include, or implement the disclosed identity authentication apparatus.

In an example, when the processor 62 calls the programs or code in the memory 64, the method shown in FIG. 1 may be implemented. Specifically, S101 to S104 are performed.

S101: Receiving a request for identity authentication on a target user.

S102: Sending identity-authentication information on the target user to other users in social-network-association with the target user. The other users in social-network-association with the target user may include at least two social-network-associated users.

S103: Receiving feedback information returned from the users in social-network-association with the target user based on the identity-authentication information, where the feedback information includes a confirmative feedback that confirms the identity-authentication information.

S104: Obtaining a result of the identity authentication on the target user based on the returned feedback information. For example, if the number of the received confirmative feedbacks meets a preset threshold, the result of the identity authentication on the target user is successful.

In one implementation, in S102, a target user in social-network-association with the target user may be selected from users in social-network-association with the target user according to social-network weights of the users in social-network-association with the target user, and further identity-authentication information on the target user is sent to the selected target social-network-associated user. Specifically, the social-network weight of the user in social-network-association with the target user may be obtained according to a social-network-association time, social-network attribute similarity, social-network group similarity, and a social-network interaction frequency between the target user and the user in social-network-association with the target user, and/or social-network activeness of the user in social-network-association with the target user.

In another implementation, the target user may be assigned with authority for replacing a social-network-associated user selected by the server. Specifically, before S102, the server sends to a user identifier of the social-network-associated user to the target user; receives an instruction for replacing a social-network-associated user that is sent by the target user; reselects, according to the instruction for replacing the social-network-associated user, a social-network-associated target user from remaining users in social-network-association with the target user; sends an identifier of the target social-network-associated user reselected by the target user; and receives an association authentication confirmation instruction sent by the target user. Certainly, the target user may directly send the association authentication confirmation instruction without replacement.

In addition, when calling the computer programs or the machine code in the memory 64, the processor 62 may schedule elements or components of the apparatus shown in FIG. 4 and FIG. 5, so as to implement the identity authentication solution according to the embodiments of the present invention.

For details of the foregoing operations, refer to the embodiments described with reference to FIG. 1 to FIG. 5 in the foregoing specification for understanding and implementation, and details are not described herein again.

Optionally, the system 60 may further include a communications unit 66. In an example, the system herein may be a server. The processor 62 may be considered as a control center of the system, and connects other components in the system by interfaces or lines in a wired or wireless manner. In an implementation, the processor 62 and the memory 64 may be connected by using a data bus. The processor 62 may be connected to a user terminal 68 or network 100 by means of an interface (which may be a wired interface or wireless interface) or the communications unit 66 in a wired or wireless manner, so as to implement interaction and communication with external data. Similarly, the memory 64 may include but is not limited to removable memories such as a ROM, a RAM, or a CD-ROM, and stores program code, functional modules, and the like. In addition, in the foregoing specification, detailed descriptions of the method and apparatus in the embodiments of the present invention are made with reference to the accompanying drawings. To avoid unnecessarily making the present disclosure fuzzy, details are not described herein again.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. An identity authentication method, comprising:
receiving a request for identity authentication on a first user from a first terminal of the first user;
sending identity-authentication information on the first user to one or more second users in social-network-association with the first user, the identity-authentication information including a description related to personal profile or experience of the first user and providing at least two selectable options for obtaining feedback information from the at least two second users in social-network-association with the first user, wherein the at least two selectable options include a confirmative feedback option confirming one item in the description of the first user included in the identity-authentication information being true and a negative feedback option suggesting the one item in the description of the first user being false;
receiving the feedback information from the one or more second users in social-network-association with the first user based on the identity-authentication information from one or more second terminals associated with the one or more second users, the feedback information from each second user including a response of the second user to the description of the first user, wherein the response including a True or False choice made by the second user between the confirmative feedback option and the negative feedback option corresponding to the one item; and
obtaining a result of identity authentication on the first user according to the feedback information from the one or more second users in social-network-association with the first user.

2. The identity authentication method according to claim 1, wherein: the description related to personal profile or experience of the first user comprises multiple items, and the second user provides the feedback information by selecting between the confirmative feedback option and the negative feedback option for each item;
the obtaining a result of the identity authentication on the first user according to the feedback information comprises:
when a number of the received confirmative feedback option selections is over a preset threshold, the result of the identity authentication on the first user is successful.

3. The identity authentication method according to claim 1, wherein the sending identity-authentication information on the first user to one or more second users in social-network-association with the first user comprises:
based on respective social-network weights of the one or more second users in social-network-association with the first user, selecting a social-network-associated user from the one or more second users in social-network-association with the first user; and
sending the identity-authentication information on the first user to the selected target social-network-associated second user.

4. The identity authentication method according to claim 3, wherein:
a social-network weight of a second user in social-network-association with the first user is obtained based on a social-network-association time, social-network attribute similarity, social-network group similarity, and a social-network interaction frequency between the first user and the second user in social-network-association with the first user, and social-network activeness of the second user in social-network-association with the first user.

5. The identity authentication method according to claim 3, before sending identity-authentication information on the first user, further comprising:
sending a user identifier of the target social-network-associated second user to the first user; and
receiving an association authentication confirmation instruction sent by the first user.

6. The identity authentication method according to claim 5, after sending the user identifier of the target social-network-associated second user and before receiving the association authentication confirmation instruction, the method further comprising:
receiving from the first user an instruction for replacing the target social-network-associated second user;
based on the instruction for replacing the target social-network-associated user, reselecting another target social-network-associated second user from remaining second users in social-network-association with the first user excluding the target social-network-associated second user being replaced; and
sending an identifier of the reselected target social-network-associated second user to the first user.

7. The identity authentication method according to claim 1, before sending the identity-authentication information, the method further comprises:
requesting the first user to fill out an information form;
receiving a completed information form from the first user; and
generating the description of the first user included in the identity-authentication information based on the completed information form.

8. The identity authentication method according to claim 1, wherein sending identity-authentication information comprises one of:
using a user identification of the first user to send the identity-authentication information to the one or more second users;
using a system message to send the identity-authentication information to the one or more second users; and
using a public account identity to send the identity-authentication information to the one or more second users.

9. An identity authentication system, comprising:
a memory; and
a processor coupled to the memory and configured for:
receiving a request for identity authentication on a first user from a first terminal of the first user;
sending identity-authentication information on the first user to one or more second users in social-network-association with the first user, the identity-authentication information including a description related to personal profile or experience of the first user and providing at least two selectable options for obtaining feedback information from the at least two second users in social-network-association with the first user, wherein the at least two selectable options include a confirmative feedback option confirming one item in the description of the first user included in the identity-authentication information being true and a negative feedback option suggesting the one item in the description of the first user being false;

receiving the feedback information from the one or more second users in social-network-association with the first user based on the identity-authentication information from one or more second terminals associated with the one or more second users, the feedback information from each second user including a response of the second user to the description of the first user, wherein the response including a True or False choice made by the second user between the confirmative feedback option and the negative feedback option corresponding to the one item; obtaining a result of identity authentication on the first user according to the feedback information from the one or more second users in social-network-association with the first user.

10. The identity authentication system according to claim 9, wherein: the description related to personal profile or experience of the first user comprises multiple items, and the second user provides the feedback information by selecting between the confirmative feedback option and the negative feedback option for each item;

the obtaining a result of the identity authentication on the first user according to the feedback information comprises:

when a number of the received confirmative feedback option selections is over a preset threshold, the result of the identity authentication on the first user is successful.

11. The identity authentication system according to claim 9, wherein the sending identity-authentication information on the first user to one or more second users in social-network-association with the first user comprises:

based on respective social-network weights of the one or more second users in social-network-association with the first user, selecting a target social-network-associated user from the one or more second users in social-network-association with the first user; and sending the identity-authentication information on the first user to the selected target social-network-associated second user.

12. The identity authentication system according to claim 11, wherein:

a social-network weight of a second user in social-network-association with the first user is obtained based on a social-network-association time, social-network attribute similarity, social-network group similarity, and a social-network interaction frequency between the first user and the second user in social-network-association with the first user, and social-network activeness of the second user in social-network-association with the first user.

13. The identity authentication system according to claim 11, before sending identity-authentication information on the first user, the processor being further configured for:

sending a user identifier of the target social-network-associated second user to the first user; and receiving an association authentication confirmation instruction sent by the first user.

14. The identity authentication system according to claim 13, after sending the user identifier of the target social-network-associated second user and before receiving the association authentication confirmation instruction, the processor being further configured for:

receiving from the first user an instruction for replacing the target social-network-associated second user;

based on the instruction for replacing the target social-network-associated user, reselecting another target social-network-associated second user from remaining second users in social-network-association with the first user excluding the target social-network-associated second user being replaced; and sending an identifier of the reselected target social-network-associated second user to the first user.

15. A non-transitory computer-readable storage medium containing computer-executable program instructions for, when executed by a processor, performing an identity authentication method, the method comprising:

receiving a request for identity authentication on a first user from a first terminal of the first user;

sending identity-authentication information on the first user to one or more second users in social-network-association with the first user, the identity-authentication information including a description related to personal profile or experience of the first user and providing at least two selectable options for obtaining feedback information from the at least two second users in social-network-association with the first user, wherein the at least two selectable options include a confirmative feedback option confirming one item in the description of the first user included in the identity-authentication information being true and a negative feedback option suggesting the one item in the description of the first user being false;

receiving the feedback information from the one or more second users in social-network-association with the first user based on the identity-authentication information from one or more second terminals associated with the one or more second users, the feedback information from each second user including a response of the second user to the description of the first user, wherein the response including a True or False choice made by the second user between the confirmative feedback option and the negative feedback option corresponding to the one item; obtaining a result of identity authentication on the first user according to the feedback information from the one or more second users in social-network-association with the first user.

16. The non-transitory computer-readable storage medium according to claim 15, wherein: the description related to personal profile or experience of the first user comprises multiple items, and the second user provides the feedback information by selecting between the confirmative feedback option and the negative feedback option for each item;

the obtaining a result of the identity authentication on the first user according to the feedback information comprises:

when a number of the received confirmative feedback option selections is over a preset threshold, the result of the identity authentication on the first user is successful.

17. The non-transitory computer-readable storage medium according to claim 15, wherein the sending identity-authentication information on the first user to one or more second users in social-network-association with the first user comprises:

based on respective social-network weights of the one or more second users in social-network-association with the first user, selecting a target social-network-associated user from the one or more second users in social-network-association with the first user; and sending the identity-authentication information on the first user to the selected target social-network-associated second user.

18. The non-transitory computer-readable storage medium according to claim 13, wherein:
a social-network weight of a second user in social-network-association with the first user is obtained based on a social-network-association time, social-network attribute similarity, social-network group similarity, and a social-network interaction frequency between the first user and the second user in social-network-association with the first user, and social-network activeness of the second user in social-network-association with the first user.

19. The non-transitory computer-readable storage medium according to claim 13, before sending identity-authentication information on the first user, the method further comprising:

sending a user identifier of the target social-network-associated second user to the first user; and receiving an association authentication confirmation instruction sent by the first user.

20. The non-transitory computer-readable storage medium according to claim 19, after sending the user identifier of the target social-network-associated second user and before receiving the association authentication confirmation instruction, the method further comprising:

receiving from the first user an instruction for replacing the target social-network-associated second user;

based on the instruction for replacing the target social-network-associated user, reselecting another target social-network-associated second user from remaining second users in social-network-association with the first user excluding the target social-network-associated second user being replaced; and sending an identifier of the reselected target social-network-associated second user to the first user.

* * * * *